United States Patent [19]
Trim

[11] Patent Number: 5,968,370
[45] Date of Patent: Oct. 19, 1999

[54] METHOD OF REMOVING HYDROCARBONS FROM CONTAMINATED SLUDGE

[75] Inventor: Mark E. Trim, Alvin, Tex.

[73] Assignee: Prowler Environmental Technology, Inc., Alvin, Tex.

[21] Appl. No.: 09/006,877

[22] Filed: Jan. 14, 1998

[51] Int. Cl.⁶ .................................................. C02F 1/52
[52] U.S. Cl. .................. 210/723; 210/787; 210/805; 210/908; 210/909
[58] Field of Search ..................... 210/723, 728, 210/774, 776, 787, 790, 805, 908, 909

[56] References Cited

U.S. PATENT DOCUMENTS

| | | |
|---|---|---|
| H001513 | 1/1996 | Murch et al. . |
| 3,010,907 | 11/1961 | Carroll . |
| 3,122,508 | 2/1964 | Grifo et al. . |
| 3,186,745 | 6/1965 | Lyles . |
| 3,310,496 | 3/1967 | Mansfield . |
| 3,312,624 | 4/1967 | Levittwon . |
| 3,715,324 | 2/1973 | Hynes . |
| 3,970,595 | 7/1976 | Ginn et al. . |
| 4,000,082 | 12/1976 | Otrhalek et al. . |
| 4,048,121 | 9/1977 | Chang . |
| 4,137,190 | 1/1979 | Chakrabarti et al. . |
| 4,140,647 | 2/1979 | Mizutani et al. . |
| 4,191,661 | 3/1980 | Halas et al. . |
| 4,199,468 | 4/1980 | Barford et al. . |
| 4,220,562 | 9/1980 | Spadini et al. . |
| 4,287,080 | 9/1981 | Siklosi . |
| 4,329,246 | 5/1982 | Gilbert et al. . |
| 4,426,105 | 1/1984 | Plaquin et al. . |
| 4,430,236 | 2/1984 | Franks . |
| 4,448,699 | 5/1984 | Barrat et al. . |
| 4,477,286 | 10/1984 | Rossmann et al. . |
| 4,522,740 | 6/1985 | Schmid et al. . |
| 4,536,314 | 8/1985 | Hardy et al. . |
| 4,539,134 | 9/1985 | Martin et al. . |
| 4,578,208 | 3/1986 | Geke et al. . |
| 4,595,520 | 6/1986 | Heile et al. . |
| 4,597,888 | 7/1986 | King . |
| 4,610,799 | 9/1986 | Wilsberg et al. . |
| 4,619,779 | 10/1986 | Hardy . |
| 4,645,608 | 2/1987 | Rayborn . |
| 4,663,082 | 5/1987 | Bobsein et al. . |
| 4,675,125 | 6/1987 | Sturwold . |
| 4,680,131 | 7/1987 | Busch et al. . |
| 4,680,134 | 7/1987 | Heile et al. . |
| 4,686,062 | 8/1987 | Kermode et al. . |
| 4,687,592 | 8/1987 | Collins et al. . |
| 4,689,167 | 8/1987 | Collins et al. . |
| 4,772,415 | 9/1988 | Adone . |
| 4,797,223 | 1/1989 | Amick et al. . |
| 4,844,744 | 7/1989 | Leiter et al. . |
| 4,851,123 | 7/1989 | Mishra . |
| 4,906,396 | 3/1990 | Falholt et al. . |
| 4,913,245 | 4/1990 | Skinner . |
| 5,002,682 | 3/1991 | Braggs et al. . |
| 5,080,831 | 1/1992 | Van Eenam . |
| 5,158,710 | 10/1992 | Van Eenam . |

(List continued on next page.)

Primary Examiner—Jay H. Woo
Assistant Examiner—Betsey J. Morrison
Attorney, Agent, or Firm—Tobor, Goldstein & Healey, L.L.P.

[57] ABSTRACT

A composition and method of removing hydrocarbons from a contaminated sludge which comprises hydrocarbons, solid particles and water is disclosed. The method comprises the steps of providing a contaminated sludge including hydrocarbons and solid particles such that the hydrocarbons are bound to at least some of the solid particles; applying a treatment fluid to the contaminated sludge, the treatment fluid comprising water, a silicate, a nonionic surfactant, an anionic surfactant, a phosphate builder and a caustic compound; contacting the contaminated sludge with the treatment fluid for a time sufficient to remove the hydrocarbons from at least some of the solid particles; separating the hydrocarbons from the treatment fluid and from the solid particles; recovering the hydrocarbons; and recycling the treatment fluid by applying the treatment fluid to additional contaminated sludge.

9 Claims, 1 Drawing Sheet

5,968,370
Page 2

U.S. PATENT DOCUMENTS

| | | |
|---|---|---|
| 5,192,461 | 3/1993 | Tomaszewski et al. . |
| 5,234,617 | 8/1993 | Hunter et al. . |
| 5,250,076 | 10/1993 | Behler et al. . |
| 5,311,820 | 5/1994 | Ellingsen . |
| 5,372,743 | 12/1994 | Miyamoto et al. . |
| 5,404,956 | 4/1995 | Bohlen et al. . |
| 5,460,747 | 10/1995 | Gosselink et al. . |
| 5,474,126 | 12/1995 | Lynde et al. . |
| 5,484,549 | 1/1996 | Hei et al. . |
| 5,494,594 | 2/1996 | Rodzewich . |
| 5,501,816 | 3/1996 | Burke et al. . |
| 5,529,711 | 6/1996 | Brodbeck et al. . |
| 5,570,749 | 11/1996 | Reed . |
| 5,634,979 | 6/1997 | Carlson et al. . |
| 5,882,524 | 3/1999 | Storey et al. . | ns

METHOD OF REMOVING HYDROCARBONS FROM CONTAMINATED SLUDGE

BACKGROUND OF THE INVENTION

1. Field of the Invention

The invention relates to a method of removing hydrocarbons from a solid particulate material, preferably from contaminated sludge containing hydrocarbons and solid particles. Even more preferably, the invention is directed to a method of removing oil from contaminated sludge from oil refineries, ballast sludge in supertankers, and also a method of removing hydrocarbons from drill cuttings contaminated with oil-based drilling fluids.

2. Description Of Related Art

Contaminated sludge from oil refineries, drilling operations, and other chemical and industrial operations often contain solid particles of different physical and chemical compositions, hydrocarbons, and water. One object of the present invention is to efficiently remove and recover hydrocarbons from the contaminated sludge. A preferred embodiment of this invention involves treating a specific type of contaminated sludge, namely, "drill cuttings," which are collected at drilling sites. During drilling operations, the drilling fluid or "mud" is circulated down into the wellbore to lubricate the drill bit and also to remove rock particles from the formation being drilled. A problem exists regarding the disposal of these drill cuttings, particularly when the drilling fluid or mud is oil-based or hydrocarbon-based. That is, the oil from the drilling fluid (as well as any oil from the formation) becomes associated or adsorbed to the surfaces of the drilling cuttings. The drill cuttings are then an environmentally hazardous material, and disposal is often a problem. The present invention offers an advantageous method of treating the drill cuttings, preferably at the location of the drilling rig, e.g., as a separate step for the drilling cuttings.

Solid-liquid separation processes in general have been used to remove solids from liquid phases with varying degrees of success. Currently, industry uses expensive filtration and centrifuge operations as well as heat and chemical treatments to treat contaminated sludge and other waste materials. A major problem industry is facing, however, is the separation and recovery of hydrocarbons from contaminated sludge. One reason for these difficulties is the fact that hydrocarbons bind to the surface of solid particles in the contaminated sludge, and to some extent, the hydrocarbons are absorbed by the solid particles, making recovery of the hydrocarbons more difficult. Furthermore, it is difficult to remove and recover hydrocarbons from concrete particulate solid surfaces because the hydrocarbons occupy the crevices between the particles.

It is known that various chemical treatments are useful to remove hydrocarbons from solid particles. These attempts have certain shortcomings. Most notably, some of these chemical treatments contain harsh solvents, including hydrocarbon based solvents, and other toxic elements, all of which can be harmful to the environment. Also, some of these chemical treatments react with the hydrocarbon, thereby preventing recovery of the hydrocarbon. Furthermore, since some of the chemical treatments react with the hydrocarbon, the chemical treatment can often not be reused or recycled. Still further, some chemical treatments are ineffective in removing and recovering certain types of hydrocarbons from contaminated sludge. For example, some chemical treatments only allow dissolution of motor oils. Still other chemical treatments only allow dissolution of vegetable oils and animal oils. Accordingly, it is another object of the present invention to develop an alternative method to remove and recover hydrocarbons from a contaminated sludge which allows recovery of numerous different types of oils and hydrocarbons, such as crude oils, motor oils, synthetic oils, graphite oils, vegetable oils and animal oils, from the contaminated sludge, as well as allows the treatment fluid to be reused and recycled. In a preferred aspect, as discussed below, a specific version of the invention yields surprisingly effective results in removing various hydrocarbons from the solid particulates and the aqueous environment.

SUMMARY OF INVENTION

In a broad aspect, the present invention relates to a method of removing hydrocarbons from solid particles, particularly from a contaminated sludge which includes hydrocarbons, solid particles and water. The hydrocarbons are bound to at least some of the solid particles, e.g., by being adsorbed or adhered to the surfaces. The method involves applying a treatment fluid to the contaminated sludge. The treatment fluid includes water, a silicate, a nonionic surfactant, an anionic surfactant, a phosphate builder and a caustic compound. The treatment fluid is then contacted with, and preferably mixed throughly with, the contaminated sludge for a time sufficient to remove the hydrocarbons from at least some of the solid particles. In accordance with a preferred embodiment, the treatment fluid causes the hydrocarbons to be desorbed and otherwise disassociated from the solid particles. Furthermore, the hydrocarbons then form a separate homogenous layer from the treatment fluid and any aqueous component. The hydrocarbons are then separated from the treatment fluid and from the solid particles in a separation step, e.g., by skimming. The hydrocarbons are then recovered, and the treatment fluid is recycled by applying the treatment fluid to additional contaminated sludge.

In a specific embodiment of the present invention, the treatment fluid is present in a concentration from at least about 100 ppm to about 60,000 ppm. Preferably, the concentration of treatment fluid is from at least about 1,000 ppm to about 30,000 ppm. Another feature of the present invention is that the treatment fluid can be applied to the contaminated sludge at a temperature from at least about 40 to about 200° F. Preferably, the temperature is about 120° F.

Another embodiment of the present invention includes a method of removing hydrocarbons from a contaminated sludge which includes hydrocarbons, solid particles and water. The method includes the steps of providing a contaminated sludge with hydrocarbons and solid particles such that the hydrocarbons are bound to at least some of the solid particles. The contaminated sludge is collected in a waste tank. The contaminated sludge is moved from the waste tank to a treatment tank where a treatment fluid is applied to the contaminated sludge. The treatment fluid includes water, a silicate, a nonionic surfactant, an anionic surfactant, a phosphate builder and a caustic compound. The treatment fluid is contacted with the contaminated sludge in the treatment tank for a time sufficient to remove the hydrocarbons from at least some of the solid particles thereby providing a treated mixture. The treated mixture is then moved to a separation tank where the hydrocarbons are separated from the treatment fluid and from the solid particles. The hydrocarbons are then removed and the treatment fluid is recycled by moving the treatment fluid to the treatment tank where the treatment fluid is applied to additional contaminated sludge.

Still another embodiment of the present invention includes a method of removing hydrocarbons from a contaminated sludge which includes hydrocarbons, solid particles and water. The method includes the steps of providing a contaminated sludge including hydrocarbons and solid particles such that the hydrocarbons are bound to at least some of the solid particles, and applying a treatment fluid to the contaminated sludge. The treatment fluid includes water, sodium metasilicate, nonyl phenol polyether, a phosphate ester, sodium tripolyphosphate and caustic soda.

The treatment fluid is contacted with the contaminated sludge for a time sufficient to remove the hydrocarbons from at least some of the solid particles. The hydrocarbons are then separated from the treatment fluid and from the solid particles. The hydrocarbons are then recovered and the treatment fluid is recycled by applying the treatment fluid to additional contaminated sludge.

Yet another embodiment of the present invention includes a method of removing hydrocarbons from a contaminated sludge which includes hydrocarbons, solid particles and water.

The method includes the steps of providing a contaminated sludge including hydrocarbons and solid particles such that the hydrocarbons are bound to at least some of the solid particles, and applying a treatment fluid to the contaminated sludge. The treatment fluid comprising water, an alkali metal silicate, alkyl phenol polyether, a phosphate ester, a condensed phosphate and an alkali metal hydroxide. The treatment fluid is contacted with the contaminated sludge for a time sufficient to remove the hydrocarbons from at least some of the solid particles. The hydrocarbons are then separated from the treatment fluid and from the solid particles. The hydrocarbons are then recovered and the treatment fluid is recycled by applying the treatment fluid to additional contaminated sludge.

In a specific embodiment of the present invention, the hydrocarbons are separated from the treatment fluid and from the solid particles by using a centrifuge.

Still another embodiment of the present invention includes a composition for removing hydrocarbons from sludge which includes hydrocarbons, solid particles and water. The composition includes water, a silicate, a nonionic surfactant, an anionic surfactant, a phosphate builder and a caustic compound.

Yet another embodiment of the present invention includes a composition for removing hydrocarbons from a sludge which includes hydrocarbons, solid particles and water. The composition includes water, sodium metasilicate, nonyl phenol polyether, a phosphate ester, sodium tripolyphosphate and caustic soda.

Still another embodiment of the present invention includes a composition for removing hydrocarbons from contaminated sludge which includes hydrocarbons, solid particles and water. The composition includes water, sodium metasilicate, nonyl phenol polyether, a phosphate ester, sodium tripolyphosphate, caustic soda, alpha olefin sulfonate, and disodium ethylenediamine tetraacetic acid.

DETAILED DESCRIPTION AND SPECIFIC EMBODIMENTS

Figure 1:
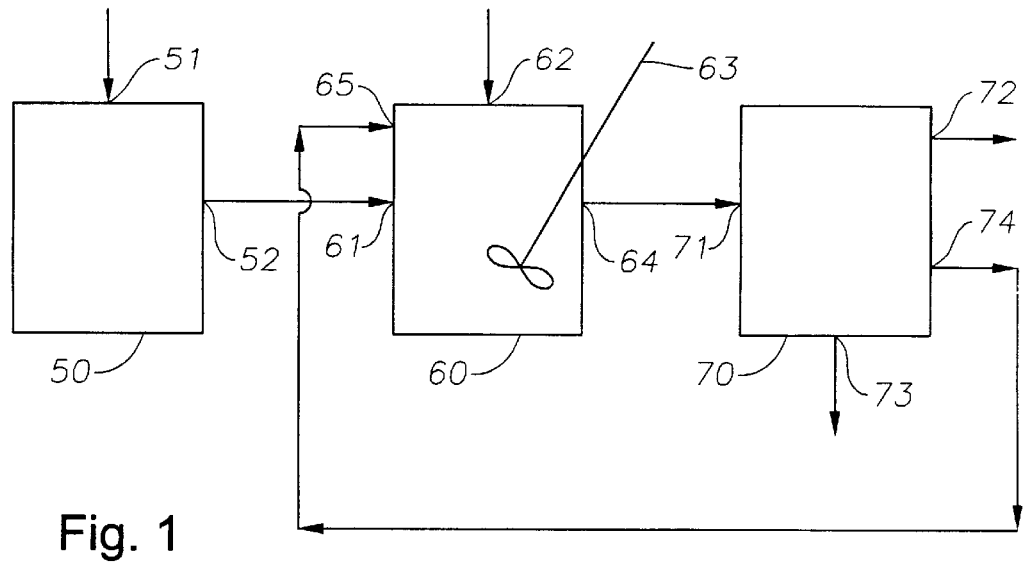
FIG. 1 is a flow diagram of one embodiment of the method of removing hydrocarbons from a contaminated sludge comprising hydrocarbons, solid particles and water.

As discussed above, the present invention relates to method of removing hydrocarbons from a solid particulate material, preferably a contaminated sludge containing hydrocarbons, solid particles and water. As used herein, "hydrocarbons" include any organic compound consisting exclusively of the elements carbon and hydrogen, such as paraffins, olefins, acetylenes, acyclic terpenes, alicyclic compounds, cycloparaffins, cycloolefins, cycloacetylenes, aromatic compounds, and cyclic terpenes; as well as derivatives of petroleum, such as crude oils, refined oils, and gasoline. "Hydrocarbons," as used herein, also include vegetable oils and animal oils. "Vegetable oils," as used herein, are defined as oils extracted from the seeds, fruit, or nuts of plants such as cottonseed, linseed, canola, corn, coconut, babassu, olive, tung, safflower, peanut, perilla, oiticica, and other cooking oils. "Animal oils," as used herein, are defined as oils derived from the tissues of animals, such as fish oils, triglycerides, lipids, phospholipids, lard, tallow, and other animal fats. As used herein, "contaminated sludge" includes any particulate material which contains hydrocarbons, such as waste material from oil refineries, ballast sludge from supertankers, and drill cuttings from drilling operations. As used herein "solid particles" includes any non-metallic solid, such as sand, concrete, soil, stones, brick, gravel, stones, glass and underground rock formations. Also, the invention is directed in certain aspects to treatment of bound solid particles such as hardened concrete surfaces.

In a specific embodiment, the present invention relates to a method of removing hydrocarbons from a contaminated sludge. The contaminated sludge includes hydrocarbons that are bound to at least some of the solid particles The method includes applying a treatment fluid to the contaminated sludge. The treatment fluid includes a mixture of water, a silicate, a nonionic surfactant, an anionic surfactant, a phosphate builder and a caustic compound. The contaminated sludge is contacted with the treatment fluid for a time sufficient to remove the hydrocarbons from at least some of the solid particles, preferably, from substantially all of the solid particles. The next step in the method is separating the hydrocarbons from the treatment fluid and from the solid particles, thereby allowing recovery of the hydrocarbons. The treatment fluid may then be recycled by applying the treatment fluid to additional contaminated sludge.

According to this invention, instead of dissolving the hydrocarbon, or forming an emulsion, it is contemplated that the treatment fluid interferes with the bond between the hydrocarbon and the solid particles, penetrates the hydrocarbon absorbed on the surface of the solid particles and then causes the hydrocarbon to separate, disassociate, or desorb, from the solid particles. The hydrocarbons then migrate away from the solid particles and form a separate phase or layer from the treatment fluid, as well as from any other aqueous components. No substantial chemical reaction occurs between the treatment fluid and the solid particles. Furthermore, no substantial chemical reaction occurs between the hydrocarbon and the treatment fluid, so that the treatment fluid retains its original properties and can be recycled for use with additional contaminated sludge. Also, the hydrocarbons can be recovered. Surprisingly, although it has been discovered that the viscosity of the hydrocarbon changes slightly after separation and removal from the contaminated sludge, the A.P.I. gravity of the hydrocarbon does not change. Accordingly, the unique properties of the treatment fluid advantageously provide for removal of hydrocarbons from contaminated sludge, or other solid particles. Therefore, the hydrocarbon is recoverable for use in other applications, and the treatment fluid may be recycled to recover hydrocarbons from additional contaminated sludge. Furthermore, after the hydrocarbons, treatment fluid, and water are removed from the solid particles, the solid particles are, preferably, substantially free of all hydrocarbon contamination. Accordingly, disposal of the solid particles are no longer hazardous to the environment.

In another specific embodiment, the present invention includes the steps of collecting the contaminated sludge in a waste tank; moving the contaminated sludge from the waste tank to a treatment tank; and applying a treatment fluid to the contaminated sludge in the treatment tank. The treatment fluid includes water, a silicate, a nonionic surfactant, an anionic surfactant, a phosphate builder and a caustic compound. The contaminated sludge is contacted with the treatment fluid in the treatment tank for a time sufficient to remove the hydrocarbons from at least some of the solid particles thereby providing a treated mixture. The treated mixture is then moved to a separation tank where the hydrocarbons are separated from the treatment fluid and from the solid particles. After separation has occurred, the hydrocarbons are removed and the treatment fluid is recycled by moving the treatment fluid to the treatment tank, where the treatment fluid is applied to additional contaminated sludge. Advantageously, no substantial chemical reaction occurs between the hydrocarbons and the treatment fluid or between the solid particles and the treatment fluid. Furthermore, the hydrocarbon molecules form a separate homogenous layer and may sometimes rise to the top of the treated mixture to be recovered by any method known to persons skilled in the art, such as skimming the hydrocarbon layer off the top of the treatment fluid. Alternatively, where the treatment fluid forms an upper layer, the treatment fluid may be removed by skimming. After the hydrocarbon layer is removed, the treatment fluid of the invention may be reused, or recycled, by returning the treatment fluid to the treatment tank to be applied to additional contaminated sludge, thereby allowing recovery of more hydrocarbons.

The anionic surfactants, utilized either alone or in combination with one another in the treatment fluid of the present invention, can broadly include polyethoxycarboxylates; N-acylsarcosinates; sulfonates, such as alkylbenzenesulfonates, short chain alkylarenesulfonates, lignosulfonates, naphthalenesulfonates, alpha olefin sulfonates, petroleun sulfonates and sulfonates with ester, amide, or ether linkages; sulfates, such as alcohol sulfates, ethoxylated and sulfated alcohols, ethoxylated and sulfated alkylphenols, sulfated acids, amides, and esters, and sulfated natural oils and fats; and phosphate esters, such as mono and diesters of orthophosphoric acid and their salts, and phosphated alkylethoxylates. Preferably, however, the anionic surfactants utilized in the treatment fluid are phosphate esters; alkylbenzenesulfonates; and alpha olefin sulfonates. More preferably, the treatment fluid includes two anionic surfactants, wherein the first anionic surfactant is an alkylbenzenesulfonate, and the second anionic surfactant is an alpha olefin sulfonate. Even more preferably, the two anionic surfactants are a phosphated alkylethoxylate and an alpha olefin sulfonate. The inventor has conducted experimental testing, and has discovered that surprisingly good hydrocarbon removal properties are obtained using these two anionic surfactants. The anionic surfactant should broadly be present in the treatment fluid at a concentration of from about 1 weight percent to about 10 weight percent, and is more preferably present in the treatment fluid at a concentration from at least about 2 weight percent to about 6.25 weight percent. Even more preferably, the concentration of the anionic surfactant in the treatment fluid is about 3 weight percent to about 4 weight percent.

The nonionic surfactants, utilized either alone or in combination with one another in the treatment fluid of the present invention, can broadly include polyoxyethylene surfactants, such as alcohol ethoxylates and alkylphenol ethoxylates; alkyl phenol polyethers; carboxylic acid esters, such as glycerol esters and polyoxyethylene esters; anhydrosorbitol esters, such as ethoxylated anhydrosorbitol esters; natural ethoxylated fats, oils, and waxes; glycol esters of fatty acids; alkyl polyglycosides; carboxylic amides, such as monoalkanolamine condensates and polyoxyethylene fatty acid amines; fatty acid glucamides; polyalkylene oxide block copolymers; and poly(oxyethylene-co-oxypropylene) nonionic surfactants. Preferably, the non-ionic surfactant utilized in the treatment fluid of the present invention are alkyl phenol polyethers, and more preferably, nonyl phenol polyether. It has been discovered through experimental testing that unexpectedly good results are obtained using an alkyl phenol polyester. The nonionic surfactant should broadly be present in the treatment fluid at a concentration of from about 1 weight percent to about 10 weight percent, and is more preferably present in the treatment fluid at a concentration from at least about 1 weight percent to about 3 weight percent. Even more preferably, the concentration of the nonionic surfactant in the treatment fluid is about 1.4 weight percent to about 2.4 weight percent.

Preferably, a silicate utilized in the treatment fluid of the present invention is an alkali metal silicate. More preferably, the silicate is sodium metasilicate. The silicate should broadly be present in the treatment fluid at a concentration of from about 0.001 weight percent to about 10 weight percent, and is more preferably present in the treatment fluid at a concentration from at least about 0.7 weight percent to about 5 weight percent. Even more preferably, the concentration of the silicate in the treatment fluid is about 2.5 weight percent to about 4.5 weight percent.

Caustic compounds are also included in the treatment fluid of the present invention. The caustic compounds include caustic potash, caustic lime and caustic soda. Preferably, the caustic compound utilized in the treatment fluid of the present invention is caustic soda. The caustic compound should broadly be present in the treatment fluid at a concentration of from about 0.001 weight percent to about 10 weight percent, and is more preferably present in the treatment fluid at a concentration from at least about 0.4 weight percent to about 8 weight percent. Even more preferably, the concentration of the caustic compound in the treatment fluid is about 0.6 weight percent to about 1.5 weight percent.

The treatment fluid also includes a phosphate builder, utilized either alone or in combination with one another in the treatment fluid of the present invention. Preferably, the phosphate builder is an orthophosphate, such as alkali metal phosphates, and condensed phosphates, such as tripolyphosphates. The alkali metal phosphates include sodium phosphate, potassium phosphate, ammonium phosphate, and calcium phosphate. Preferably, the phosphate builder is a condensed phosphate. Even more preferably, the phosphate builder is sodium tripolyphosphate. The phosphate builder should broadly be present in the treatment fluid at a concentration of from about 0.001 weight percent to about 10 weight percent, and is more preferably present in the treatment fluid at a concentration from at least about 0.5 weight percent to about 4.5 weight percent. Even more preferably, the concentration of the phosphate builder in the treatment fluid is about 2.5 weight percent to about 4.5 weight percent.

Chelating agents may also be included in the treatment fluid of the present invention. Preferably, the chelating agents utilized in the present invention are ethylenediamine tetraacetic acid (EDTA), disodium ethylenediamine tetraacetic acid, nitrilotriacetic acid, and ethyleneglycol-bis(β-aminoethyl ether)-N, N-tetra acetic acid. More preferably, the chelating agent utilized in the treatment fluid of the present invention is disodium ethylenediamine tetraacetic acid. The chelating agent should broadly be present in the treatment fluid at a concentration of from about 0.001 weight percent to about 10 weight percent, and is more preferably present in the treatment fluid at a concentration from at least about 0.8 weight percent to about 5 weight percent. Even more preferably, the concentration of the chelating agent in the treatment fluid is about 1 weight percent to about 2.5 weight percent.

Preferably, the treatment fluid has a density greater than the density of water, which may be included with the contaminated sludge. Due to this difference in density, the treatment fluid penetrates the contaminated sludge and the water and contacts the solid particles contaminated with hydrocarbons on the bottom of the treatment tank. The treatment fluid also mixes with the water in the contaminated sludge thereby increasing the density of the water. In doing so, the water in the contaminates sludge, which now contains the treatment fluid, becomes heavier. Therefore, the water containing the treatment fluid provides greater interaction between the treatment fluid and the solid particles of the contaminated sludge. This aids in the removal of the hydrocarbons from the solid particles of the contaminated sludge, as well as assists the hydrocarbons to form an upper layer more quickly. This occurs because the hydrocarbons have a density less than the water and the treatment fluid. The higher the density of both the water and the treatment fluid and faster the hyrocarbons form the upper layer. This natural separation aids in the recovery of the hydrocarbons, the treatment fluid, solid particles, and water. Accordingly, the treatment fluid of the present invention, preferably has a density greater than at least about 8.34 lbs/gal. More preferably, the treatment fluid has a density of from at least about 8.5 lbs/gal to about 9.0 lbs/gal.

Referring now to FIG. 1, in one specific embodiment of the present invention, the method may be carried out utilizing a waste tank 50, a treatment tank 60 and a separation tank 70. It is noted, however, that the waste tank 50 and the treatment tank 60 may be combined in a single tank, i.e., a treatment tank. The method includes the steps of collecting in a waste tank 50 a contaminated sludge with hydrocarbons bound to at least some of the solid particles (not shown). The waste tank 50 includes an inlet 51 for receiving the contaminated sludge. The waste tank 50 has an outlet 52 in communication with first inlet 61 of the treatment tank 60. Treatment tank 60, which is preferably smaller than the waste tank 50, can be an open vessel or it may be closed, having a second inlet 62 for receiving treatment fluid.

The treatment fluid used to treat the contaminated sludge includes at least water, a silicate, a nonionic surfactant, an anionic surfactant, a phosphate builder and a caustic compound (not shown). The treatment fluid preferably includes a chelating agent. A preferred treatment fluid includes water, sodium metasilicate, nonyl phenol polyester, a phosphate ester, sodium tripolyphosphate, caustic soda, alpha olefin sulfonate, and disodium ethylenediamine tetraacetic acid.

Preferably, the treatment fluid is present in the treatment tank 60 at a concentration of at least about 100 ppm to about 60,000 ppm. More preferably, the treatment fluid is present in the treatment tank 60 at a concentration of from about at least 1,000 ppm to about 30,000 ppm. For example, if the volume of water and contaminated sludge in the treatment tank 60 is 100 milliliters, then a 3 milliliter volume of the treatment fluid added to the treatment tank 60 results in a 30,000 ppm concentration of the treatment fluid being added to the treatment tank 60. The treatment fluid is then applied to the contaminated sludge in the treatment tank 60, which is preferably heated so that the contaminated sludge being treated has a temperature of at least about 40 to about 200° F. Preferably, the temperature is maintained at about 120° F. The treatment fluid is allowed to contact the contaminated sludge in the treatment tank 60 at least for a time sufficient to remove the hydrocarbons from at least some of the solid particles thereby providing a treated mixture (not shown).

The contaminated sludge being treated may be agitated or mixed during all or part of the time the treatment fluid is in contact with the contaminated sludge in the treatment tank 60. Any appropriate mixing or agitation device 63 may be used to mix the treatment mixture. The amount of time the treatment fluid contacts the contaminated sludge is dependent on the presence or absence of agitation. If agitated, the treatment fluid should contact the contaminated sludge preferably for at least about 1 minute to about 6 hours, and more preferably, for at least about 10 minutes to about 1 hour. Under static conditions, the treatment fluid contacts the contaminated sludge preferably for at least about 1 hour to about 72 hours, and more preferably, for at least about 6 hours to about 48 hours. The treatment tank 60 includes an outlet 64 in communication with inlet 71 of the separation tank 70. After the hydrocarbons are sufficiently removed from the contaminated sludge in treatment tank 60, the treated mixture is transferred to separation tank 70 via the connection between outlet 64 of the treatment tank 60 and inlet 71 of the separation tank 70. In separation tank 70, the hydrocarbons (not shown) are separated from the treatment fluid and from the solid particles (not shown). A hydrocyclone (not shown) or centrifuge (not shown) or ultrasonic or other vibration device (not shown) or recess plate and frame, also known as a chamber filter press (not shown) or a clarifier tank (not shown) or settling tank (not shown) may be used to separate the hydrocarbons from the treatment fluid and from the solid particles. Preferably, the hydrocarbons are separated from the treatment fluid and the solid particles using a centrifuge.

Separation tank 70 includes a first outlet 72 for removing the hydrocarbons from the separation tank 70. The hydrocarbons may be skimmed from the top of the treated mixture in separation tank 70 in a process where the hydrocarbons form the upper layer. Separation tank 70 includes a second outlet 73 for removing the solid particles from the separation tank 70. Separation tank 70 includes a third outlet 74 in communication with a second inlet 65 of the treatment tank 60 for removing the treatment fluid from the separation tank 70 and introducing the treatment fluid into the treatment tank 60. Thus, the treatment fluid may be recycled by applying the treatment fluid to additional contaminated sludge in the treatment tank 60. Valves, pumps and other devices (not shown) may be interposed before the waste tank 50, between the waste tank 50 and the treatment tank 60, between the treatment tank 60 and the separation tank 70, and after the separation tank 70 as necessary.

In another specific embodiment (not shown), the contaminated sludge is contacted with the treatment fluid in a single tank. The treated mixture may be agitated or mixed any time during the time the contaminated sludge and the treatment fluid are in contact. After the treatment fluid and contaminated sludge have been in contact for a time sufficient to remove hydrocarbons from at least some of the solid particles, the hydrocarbons will separate from the treatment fluid and rise to the top of the treated mixture. The hydrocarbons can then be recovered by skimming the top of the treated mixture or any other method known to persons skilled in the art. Regardless of which method is used to remove the separated hydrocarbons from the treated mixture, the treatment fluid may be recycled by applying additional contaminated sludge to the recovered treatment fluid, thereby allowing the recovery of more hydrocarbon from the contaminated sludge.

Figure 2:
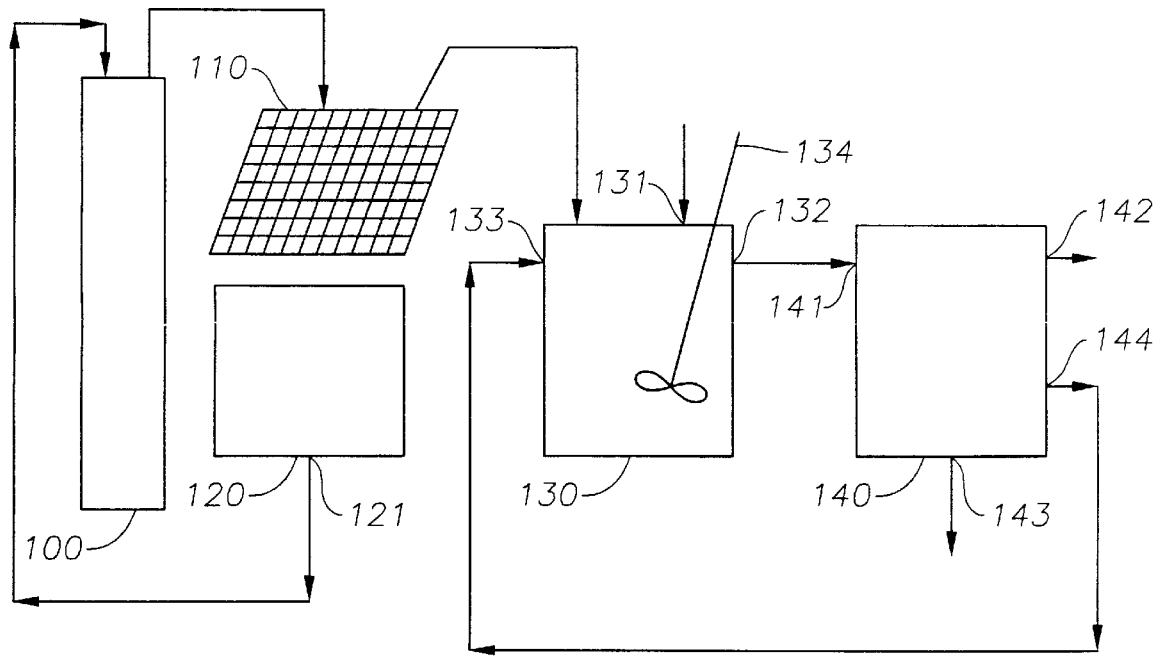
FIG. 2 is a flow diagram of another specific embodiment of the method, involving removing hydrocarbons from drilling cuttings contaminated with hydrocarbons.

Referring now to FIG. 2, another specific embodiment of the invention is directed to a method of removing hydrocarbons from drill cuttings. The method may be carried out near the wellbore 100 of the drilling operation. A conventional drilling rig utilizes equipment for separating drill cuttings from the drilling fluid after it leaves the wellbore. Typically, this equipment includes a solids filtration device such as a sieve, that is typically vibrated. The system in FIG. 2 includes a conventional sieve 110 and a drilling fluid tank 120. In accordance with this invention, FIG. 2 also includes a treatment tank 130 and a separation tank 140. It is noted, however, that the treatment tank 130 and the separation tank may be combined into a single tank, i.e., a treatment tank. In this specific embodiment, drill cuttings and drilling fluid are removed from the wellbore 100. The drill cuttings and drilling fluid, which are mixed, are then passed through a sieve 110. Preferably, sieve 110 includes openings such that substantially all of the drill cuttings are not allowed to pass through the sieve 110 into the drilling fluid tank 120, except that, consistent with drilling operations, the smaller particles are allowed to remain with the drilling fluid as it recirculates back to the wellbore 100. The drilling fluid, however, is permitted to pass through the sieve 110 into drilling fluid tank 120, which is preferably a system of tanks that handles the reconstituting of the drilling fluid prior to being pumped back down the wellbore 100. The drilling fluid tank 120 includes outlet 121 in communication with the wellbore 100 through which the drilling fluid may be returned to the wellbore 100 to further aid in the drilling operation. The drill cuttings, which do not pass through sieve 110, can be transferred to the treatment tank 130 by dumping the drill cuttings from sieve 110, or by configuring the sieve 110 at an angle such that the drill cuttings slide down the sieve 110 and into the treatment tank 130, or by any other method of transferring the drill cuttings known to those skilled in the art. The treatment tank 130 can be an open vessel or it may be closed, having an inlet 131 for receiving the treatment fluid.

The treatment fluid used to treat the drill cuttings can be one of the treatment fluids discussed herein. Broadly, the treatment fluid includes at least a silicate, a nonionic surfactant, an anionic surfactant, a phosphate builder and a caustic compound. The treatment fluid preferably includes a chelating agent. A preferred treatment fluid contains water, sodium metasilicate, a phosphate ester, sodium tripolyphosphate, caustic soda, alpha olefin sulfonate, and disodium ethylenediamine tetraacetic acid.

Preferably, the treatment fluid is present in the treatment tank 130 at a concentration of at least about 100 ppm to about 60,000 ppm. More preferably, the treatment fluid is present in the treatment tank 130 at a concentration of from about 1,000 ppm to about 30,000 ppm. The treatment fluid is then applied to the drill cuttings in the treatment tank 130, which is preferably heated so that the mixture of treatment fluid and drill cuttings have a temperature of at least about 40 to about 200° F. Preferably, the temperature is maintained at about 120° F. The treatment fluid is allowed to contact the drill cuttings in the treatment tank 130 at least for a time sufficient to remove the hydrocarbons from at least some of the drill cuttings thereby providing a treated mixture.

The drill cuttings being treated may be agitated or mixed during all or part of the time the treatment fluid is in contact with the drill cuttings in the treatment tank 130. Any appropriate mixing or agitation device 134 may be used to mix the treatment mixture. The amount of time the treatment fluid contacts the drill cuttings is dependent on the presence or absence of agitation. If agitated, the treatment fluid should contact the drill cuttings preferably for at least about 1 minute to about 6 hours, and more preferably, for at least about 10 minutes to about 1 hour. Under static conditions, the treatment fluid contacts the drill cuttings preferably for at least about 1 hour to about 72 hours, and more preferably, for at least about 6 hours to about 48 hours. The treatment tank 130 includes an outlet 132 in communication with inlet 141 of the separation tank 140. After the hydrocarbons are sufficiently removed from the drill cuttings in treatment tank 130, the treated mixture is transferred to separation tank 140 via the connection between outlet 131 of the treatment tank 130 and inlet 141 of the separation tank 140.

In separation tank 140, the hydrocarbons are separated from the treatment fluid and from the drill cuttings. In accordance with this invention, not only are the hydrocarbons removed from the solid drill cuttings, but also the hydrocarbons and the treatment fluid form distinct homogenous layers, such that both can be easily separated and recovered. In addition to the separation tank, other separation devices can be used, including a hydrocyclone, a centrifuge, an ultrasonic device or some other vibration device, or a recess plate and frame, also known as a chamber filter press. Furthermore, additional tanks may be used, such as a clarifier tank, to separate the hydrocarbons from the treatment fluid and from the drill cuttings. Preferably, the hydrocarbons are separated from the treatment fluid and the drill cuttings using a centrifuge.

Separation tank 140 includes a first outlet 142 for removing the hydrocarbons from the separation tank 140. Where the hydrocarbons form the upper layer, the hydrocarbons may be skimmed from the top of the treated mixture in separation tank 140. Separation tank 140 includes a second outlet 143 for removing the decontaminated drill cuttings from the separation tank 140. Separation tank 140 includes a third outlet 144 in communication with a second inlet 133 of the treatment tank 130 for removing the treatment fluid from the separation tank 140 and introducing the treatment fluid back into the treatment tank 130. Thus, the treatment fluid may be recycled by applying the treatment fluid to additional drill cuttings in the treatment tank 130. Valves, pumps and other devices (not shown) may be interposed before the treatment tank 130, between the treatment tank 130 and the separation tank 140, and after the separation tank 140 as necessary.

In another specific embodiment of the invention, the treatment fluid identified above, at concentrations identified above, may be applied to other synthetic, organic or inorganic solid materials having hydrocarbons bound to their surfaces. One such specific embodiment includes a method for the recovery of hydrocarbons from underground formations such as oil and gas wells, e.g., as part of the primary production operations or as part of a waterflood or secondary recovery operation. That method includes the steps of applying a treatment fluid described above, at a concentration described above, to the underground formation by injection, including flooding the underground formation, or by any other method known to those skilled in the art. The contaminated underground formation is contacted with the treatment fluid under pressure for a time sufficient to remove at least a portion of the hydrocarbons from the underground formation. After the treatment fluid containing the hydrocarbons is removed from the underground formation, the hydrocarbons may then be separated and recovered from the treatment fluid and from any accompanying water. The treatment fluid may then be recycled by applying the treatment fluid to additional contaminated underground formations.

Another alternative embodiment includes a method for removing hydrocarbons from concrete surfaces having solid particles bound together, e.g., by hydration. Such surfaces are found in driveways, parking lots, garages, and automobile service stations. The method involves the steps of applying a treatment fluid described above, at a concentration described above, to the portion of the concrete surface contaminated with the hydrocarbons, e.g., oil staining the concrete surface. The contaminated concrete surface is contacted with the treatment fluid for a time sufficient to remove the hydrocarbons from that portion of the concrete surface. The treatment fluid may be scrubbed into the crevices of the concrete surface using a brush or other appropriate device, thereby providing for enhanced contact, and resulting in removal of substantially all of the hydrocarbons from the concrete surface. After the hydrocarbons are removed from the concrete surface, the hydrocarbon and treatment fluid mixture may then be collected, e.g., by spraying the concrete surface with water and/or vacuuming the mixture into a separation tank, and collecting the resulting hydrocarbons, treatment fluid and water in a vessel such as a gutter or groove proximate to the concrete surface. The hydrocarbons may then be recovered by separating the hydrocarbons from the treatment fluid and from the water. After the hydrocarbons are recovered, the treatment fluid may then be recycled by applying the treatment fluid to additional contaminated concrete surfaces.

Still another alternative embodiment includes a method for removing hydrocarbons from organic solid substances such as plants, skin, fur and feathers contaminated with hydrocarbons. Thus, it provides an excellent method of cleaning up after oil spills. The method comprises the steps of applying a treatment fluid described above, at a concentration described above, to the contaminated organic solid substance. The contaminated organic solid substance, e.g., the feathers of a bird soaked in oil, is contacted with the treatment fluid for a time sufficient to remove the hydrocarbons from at least a portion of the organic solid substance. Towels, brushes, or other appropriate scrubbing devices may be employed to aid in the removal of the hydrocarbons from the organic solid substances. After the hydrocarbons are removed from the organic solid substance, the hydrocarbons and the treatment fluid mixture may then be collected, e.g., by rinsing the organic solid substance with water. The hydrocarbons may then be separated from the treatment fluid and water. Advantageously, the treatment fluid may be recycled. That is, the same treatment fluid can be used again with additional contaminated organic solid substances.

EXAMPLES

A series of tests was conducted which demonstrate certain advantageous features of the invention. Results are indicated in Table I. A mixture of oil and sand was formed by mixing 5 ml of oil with 20 g of sand (total weight 24.3 g). The oil and sand mixture was placed in a number of glass beakers, each filled with 100 ml of water. The oil used in this experiment was waste oil obtained from an oil pit at a automobile service station which included a mixture of graphite and synthetic oil, used motor or crankshaft oil, transmission oil, and grease. Three milliliters of the different treatment fluids of the invention (Samples A–H) were added to the aqueous oil and sand mixture in the glass beakers. Each sample included water, sodium tripolyphosphate (CAS # 7758-29-4, from FMC Corporation, Philadelphia, Pa.), sodium metasilicate (Metso 20 from Van Waters & Rogers, Inc., Houston, Tex.), nonyl phenol polyether (MACOL® NP 9.5 from PPG Industries, Inc., Gurnee, Ill.) and a phosphated alkyl ethoxylate (free acid) (TC-777 from Titan Chemical Corporation, Houston, Tex.). Alkyl ($C_{14}$–$C_{16}$) olefin sulfonate, sodium salt (Witconate AOS from Witco Corp., Houston, Tex.), was added to Samples B, E, F and H. Caustic soda (OXYCHEM® from Occidental Chemical Corporation, Dallas Tex.), was added to Samples D, F, G and H. Disodium ethylenediamine tetraacetic acid (VERSENE® 100 chelating agent from Dow Chemical Corporation, Midland, Mich.), was added to Samples C, E, G and H. Samples A–H were composed as follows:

| SAMPLE A component | wt % |
|---|---|
| water | 87.85 |
| sodium tripolyphosphate | 3.49 |
| sodium metasilicate | 3.49 |
| nonyl phenol polyether | 1.98 |
| phosphated alkyl ethoxylate (free acid) | 3.19 |
| SAMPLE B | |
| water | 84.60 |
| sodium tripolyphosphate | 3.49 |
| sodium metasilicate | 3.49 |
| nonyl phenol polyether | 1.98 |
| phosphated alkyl ethoxylate (free acid) | 3.19 |
| alkyl ($C_{14}$–$C_{16}$) olefin sulfonate, sodium salt | 3.25 |
| SAMPLE C | |
| water | 84.63 |
| sodium tripolyphosphate | 3.49 |
| sodium metasilicate | 3.49 |
| nonyl phenol polyether | 1.98 |
| phosphated alkyl ethoxylate (free acid) | 3.19 |
| disodium ethylenediamine tetraacetic acid | 1.22 |
| SAMPLE D | |
| water | 86.85 |
| sodium tripolyphosphate | 3.49 |
| sodium metasilicate | 3.49 |
| nonyl phenol polyether | 1.98 |
| phosphated alkyl ethoxylate (free acid) | 3.19 |
| caustic soda | 1.00 |
| SAMPLE E | |
| water | 83.38 |
| sodium tripolyphosphate | 3.49 |
| sodium metasilicate | 3.49 |
| nonyl phenol polyether | 1.98 |
| phosphated alkyl ethoxylate (free acid) | 3.19 |
| alkyl ($C_{14}$–$C_{16}$) olefin sulfonate, sodium salt | 3.25 |
| disodium ethylenediamine tetraacetic acid | 1.22 |
| SAMPLE F | |
| water | 83.60 |
| sodium tripolyphosphate | 3.49 |
| sodium metasilicate | 3.49 |
| nonyl phenol polyether | 1.98 |
| phosphated alkyl ethoxylate (free acid) | 3.19 |
| alkyl ($C_{14}$–$C_{16}$) olefin sulfonate, sodium salt | 3.25 |
| caustic soda | 1.00 |
| SAMPLE G | |
| water | 85.63 |
| sodium tripolyphosphate | 3.49 |
| sodium metasilicate | 3.49 |
| nonyl phenol polyether | 1.98 |

-continued

| SAMPLE A component | wt % |
|---|---|
| phosphated alkyl ethoxylate (free acid) | 3.19 |
| disodium ethylenediamine tetraacetic acid | 1.22 |
| caustic soda | 1.00 |
| SAMPLE H | |
| water | 82.38 |
| sodium tripolyphosphate | 3.49 |
| sodium metasilicate | 3.49 |
| nonyl phenol polyether | 1.98 |
| phosphated alkyl ethoxylate (free acid) | 3.19 |
| disodium ethylenediamine tetraacetic acid | 1.22 |
| alkyl ($C_{14}$–$C_{16}$) olefin sulfonate, sodium salt | 3.25 |
| caustic soda | 1.00 |

Each resulting mixture was allowed to remain undisturbed throughout the test. The time at which the first droplet of oil released from the sand and floated to the top of the beaker was recorded as the Release Time, which is considered to be a vital measure of hydrocarbon removal effectiveness. In a contaminated sludge treatment process, for example, the amount of contaminated sludge that can be decontaminated is inversely proportional to the Release Time. A visual inspection of the surface was used to determine Clean Surface Time. In each of the tests, one hour after the Release Time, all liquid (treatment fluid and hydrocarbon) was drained, and the sand and oil remaining attached to the sand was placed in centrifuge tubes. The centrifuge tubes were balanced with one another using hot water (200° F.) to ensure that the centrifuge operated properly. After centrifugation, the weight of the sand and oil was measured and the Percent Oil Remaining was calculated and is shown in Table I. Percent Oil Remaining was calculated by subtracting the weight of the sand and oil after the test, from the weight of the sand and oil mixture prior to the test (24.3 g). This value was then divided by 24.3 giving a value which was multiplied by 100%.

TABLE I

| SAMPLE | RELEASE TIME | CLEAN SURFACE TIME (min) | PERCENT OIL REMAINING |
|---|---|---|---|
| A | 2 min 45 sec | 26 | 5 |
| B | 3 min 40 sec | 30 | 5 |
| C | 4 min 19 sec | 35 | 5 |
| D | 2 min 40 sec | 23 | 2 |
| E | 3 min 45 sec | 28 | 4 |
| F | 2 min 30 sec | 23 | 2 |
| G | 2 min 30 sec | 23 | 2 |
| H | 1 min 14 sec | 20 | 1 |

These results indicate that the treatment fluid of the present invention is capable of effectively removing the bound hydrocarbons from the contaminated sludge (oil and sand mixture) in a short amount of time. For example, Sample H, the preferred treatment fluid of the invention, removed 99% of the oil from the sand, without any agitation of the glass beaker. Samples D, F, and G, other specific embodiments, removed 98% of the oil from the sand. These results show the dramatic improvement for recovering hydrocarbons from contaminated sludge.

It is to be understood that the invention is not limited to the exact details of construction, operation, exact materials or embodiments shown and described, as obvious modifications and equivalents will be apparent to one skilled in the art. Various components may be configured or connected in a variety of ways to carry out the method of the invention. As mentioned above, various types of separation techniques may be used in accordance with this invention. Preferably, separation of the hydrocarbons from the treatment fluid is achieved through the use of a centrifuge. Separation of the hydrocarbons may also be accomplished using a settling tank or may include a hydrocyclone, a recess plate and frame, or a clarifier tank. Additionally, various types of equipment may be used to carry out the method of the invention. Accordingly, the scope of the invention should be determined based on the claims below, including any equivalents thereof.

What is claimed is:

1. A method of removing hydrocarbons from a contaminated sludge which comprises hydrocarbons, solid particles and water, the method comprising the steps of:
    (a) providing a contaminated sludge including hydrocarbons and solid particles such that the hydrocarbons are bound to at least some of the solid particles;
    (b) applying a treatment fluid to the contaminated sludge, the treatment fluid comprising water, a silicate, a nonionic surfactant, an anionic surfactant, a phosphate builder and a caustic compound;
    (c) contacting the contaminated sludge with the treatment fluid for a time sufficient to remove the hydrocarbons from at least some of the solid particles;
    (d) separating the hydrocarbons from the treatment fluid and from the solid particles;
    (e) recovering the hydrocarbons; and
    (f) recycling the treatment fluid by applying the treatment fluid to additional contaminated sludge.

2. The method of claim 1, wherein the treatment fluid is present in a concentration from at least about 100 ppm to about 60,000 ppm.

3. The method of claim 2, wherein the treatment fluid is present in a concentration of about 1500 ppm.

4. The method of claim 1, wherein the treatment fluid is applied to the contaminated sludge at a temperature of at least about 40 to about 200 degrees F.

5. The method of claim 4, wherein the treatment fluid is applied to the contaminated sludge at a temperature of about 120 degrees F.

6. A method of removing hydrocarbons from a contaminated sludge which comprises hydrocarbons, solid particles and water, the method comprising the steps of:
    (a) providing a contaminated sludge with hydrocarbons and solid particles such that the hydrocarbons are bound to at least some of the solid particles;
    (b) collecting the contaminated sludge in a waste tank;
    (c) moving the contaminated sludge from the waste tank to a treatment tank;
    (d) applying a treatment fluid to the contaminated sludge in the treatment tank, the treatment fluid comprising water, a silicate, a nonionic surfactant, an anionic surfactant, a phosphate builder and a caustic compound;
    (e) contacting the contaminated sludge with the treatment fluid in the treatment tank, for a time sufficient to remove the hydrocarbons from at least some of the solid particles thereby providing a treated mixture;
    (f) moving the treated mixture to a separation tank;
    (g) separating the hydrocarbons from the treatment fluid and from the solid particles;
    (h) removing the hydrocarbons; and
    (i) recycling the treatment fluid by moving the treatment fluid to the treatment tank, wherein the treatment fluid is applied to additional contaminated sludge.

7. A method of removing hydrocarbons from a contaminated sludge which comprises hydrocarbons, solid particles and water, the method comprising the steps of:
   (a) providing a contaminated sludge including hydrocarbons and solid particles such that the hydrocarbons are bound to at least some of the solid particles;
   (b) applying a treatment fluid to the contaminated sludge, the treatment fluid comprising water, sodium metasilicate, nonyl phenol polyether, a phosphate ester, sodium tripolyphosphate and caustic soda;
   (c) contacting the contaminated sludge with the treatment fluid for a time sufficient to remove the hydrocarbons from at least some of the solid particles;
   (d) separating the hydrocarbons from the treatment fluid and from the solid particles;
   (e) recovering the hydrocarbons; and
   (f) recycling the treatment fluid by applying the treatment fluid to additional contaminated sludge.

8. A method of removing hydrocarbons from a contaminated sludge which comprises hydrocarbons, solid particles and water, the method comprising the steps of:
   (a) providing a contaminated sludge including hydrocarbons and solid particles such that the hydrocarbons are bound to at least some of the solid particles;
   (b) applying a treatment fluid to the contaminated sludge, the treatment fluid comprising water, an alkali metal silicate, alkyl phenol polyether, a phosphate ester, a condensed phosphate and an alkali metal hydroxide;
   (c) contacting the contaminated sludge with the treatment fluid for a time sufficient to remove the hydrocarbons from at least some of the solid particles;
   (d) separating the hydrocarbons from the treatment fluid and from the solid particles;
   (e) recovering the hydrocarbons; and
   (f) recycling the treatment fluid by applying the treatment fluid to additional contaminated sludge.

9. The method of claim 8, wherein the hydrocarbons are separated from the treatment fluid and from the solid particles by using a centrifuge.

* * * * *